United States Patent [19]
Morch

[11] Patent Number: 6,131,691
[45] Date of Patent: Oct. 17, 2000

[54] SYSTEM FOR GUIDED STEERING OF AT LEAST ONE SET OF WHEELS OF A SEMI-TRAILER OR A TRAILER

[75] Inventor: Leo Morch, Gistrup, Denmark

[73] Assignee: Morch & Sonner A/S, Syenstrup, Denmark

[21] Appl. No.: 09/267,137

[22] Filed: Mar. 11, 1999

Related U.S. Application Data

[63] Continuation of application No. PCT/DK97/00384, Sep. 10, 1997.

[30]     Foreign Application Priority Data

Sep. 13, 1996 [DK] Denmark .............................. 9600308 U

[51] Int. Cl.$^7$ .................................................. B62D 13/00
[52] U.S. Cl. .......................... 180/418; 180/412; 180/414; 280/81.6; 280/426; 280/442; 280/443; 280/445
[58] Field of Search ...................................... 180/418, 412, 180/414; 280/426, 442, 443, 445, 81.6

[56]     References Cited

U.S. PATENT DOCUMENTS

| | | | |
|---|---|---|---|
| 4,984,647 | 1/1991 | Morishita et al. ...................... | 180/446 |
| 5,014,801 | 5/1991 | Hirose ..................................... | 180/412 |
| 5,035,439 | 7/1991 | Petrillo ................................... | 280/81.6 |
| 5,225,983 | 7/1993 | Ohmura et al. ........................... | 701/48 |
| 5,257,191 | 10/1993 | Takehara et al. ......................... | 701/43 |
| 5,280,939 | 1/1994 | Kee et al. ................................ | 280/432 |
| 5,295,550 | 3/1994 | Chikuma ................................. | 180/412 |
| 5,392,214 | 2/1995 | Momose et al. .......................... | 701/44 |

FOREIGN PATENT DOCUMENTS

| | | |
|---|---|---|
| 0 126 387 | 5/1984 | European Pat. Off. . |
| 0 710 601 A1 | 8/1996 | European Pat. Off. . |

*Primary Examiner*—Brian L. Johnson
*Assistant Examiner*—Deanna Draper
*Attorney, Agent, or Firm*—Thomas R. Vigil

[57]     ABSTRACT

The system for guided steering of a set of rear wheels of a semi-trailer comprises a pulling vehicle and a semi-trailer having rear wheels which are turnable with respect to a chassis of the trailer to turn from a neutral position to one or the other side of the semi-trailer for generating steering of the vehicle in one direction with respect to a neutral position. The system further comprises power generating apparatus to act on the rear wheels to generate turnings of the rear wheels, activating apparatus mounted in the driver's cabin of the vehicle for operation by the driver of the vehicle for generating a steering of the rear wheels independently of the steering of the vehicle as well as locking structure operated from the driver's cabin, in a first position for generating locking of the rear wheels in the neutral position, and switchable from the first position to a second position, where the rear wheels are released and brought to turn by activation of the activating apparatus. Furthermore, the system comprises blocking apparatus comprising a speed detector of the vehicle for detection of the speed of the vehicle and for determination of whether or not the speed of the vehicle is higher or lower than a preset speed limit, the blocking apparatus cooperating with the locking structure to generate blocking of the locking apparatus in the first position, when the speed detected by the blocking apparatus is higher than the speed limit, and to release the locking structure from the blocking when the speed detected by the blocking apparatus is lower than the speed limit.

23 Claims, 3 Drawing Sheets

SYSTEM FOR GUIDED STEERING OF AT LEAST ONE SET OF WHEELS OF A SEMI-TRAILER OR A TRAILER

This application is a continuing application of PCT/DK 97/00384 filed on Sep. 10, 1997.

BACKGROUND OF THE INVENTION

This invention in general concerns cargo vehicles and in particular lorries or trucks having a semi-trailer or trailer, i.e. vehicles of the type that comprises a pulling vehicle having a trailer mounted, or a so-called tractor and a semi-trailer attached thereto. Although the invention is defined to concern trucks or lorries it will be obvious to persons skilled in the art that also vehicles for transporting persons, for example busses, may be designed in accordance with the teaching of the present invention so the invention is also to comprise the use of the invention within such closely related and technically equivalent areas. More particularly, the invention concerns a technique whereby the maneuvering abilities of such vehicles is improved without traffic safety being deteriorated.

The invention particularly concerns a system for guiding at least one set of rear wheels on a semi-trailer or trailer of a cargo vehicle, which comprises said semi-trailer or trailer and a truck trailer or tractor, and comprising bearing means in which said rear wheels are journalled rotatably with respect to the chassis of the semi-trailer or trailer so that said rear wheels can turn from neutral position, in which the rear wheels generate no steering effect, to one side in order to generate steering of the vehicle in one direction with respect to said neutral position, or to the other side side in order to generate steering of the vehicle in the opposite direction with respect to said neutral position, power generating means adapted to affect said rear wheels and, when activated, to generate said turning of said rear wheels to one or the other side, activation means, mounted in the cabin of the vehicle and adapted to be operated by the driver of the vehicle for activating one of the power generating means and for generating steering of said at least one set of rear wheels independently of the steering of the truck trailer or tractor, and locking means adapted to be operated from the driver's cabin of the vehicle for generating, in a first position locking of said rear wheels in said neutral position, and being switchable from said first position to a second position, in which the rear wheels are released and may be brought to turn by activation of the activation means.

Systems of this kind are known within the art, more particularly from the following patents, U.S. Pat. No. 5,213,353, U.S. Pat. No. 5,035,439 U.S. Pat. No. 2,930,631 and FR 2,645,105. These publications disclose systems of the kind stated above as well as components for such systems. As described in for example U.S. Pat. No. 5,035,439 these systems are operated by the driver of the vehicle, in which the system is mounted, activating a switch, which is connected to the locking means, and which by activation switches the locking means from the first position to the second position, upon which it is possible for the driver to generate the turning of the guided steering rear wheels by activating the activation means. By generating the guided steering of the rear wheels a substantial reduction of the total turning diameter is generated, as realized in the said prior art, which, during forwards or backwards driving, enables the vehicle to turn round even very sharp corners and thus maneuver at a very limited area, including maneuvering in an area considerably smaller than what is required for maneuvering a similar vehicle having no guided steering system, for instance to turn round a sharp corner, back up to a loading ramp, turn in a limited area etc. It will be evident to persons skilled in the art, however, that a reduction in the turning diameter to such a substantial extent as achieved by a guided steering system of the this art necessarily entails instability in driving at normal speed on a road and thereby entails a safety risk not only to the driver of the vehicle but also for other persons in the traffic in case the driver activates the guided steering system when driving on a normal road and brings the vehicle to turn very sharply and thereby provokes a considerable risk of said vehicle turning over or loosing its steering capability because of skidding.

It should be noted that in connection with a different technique, i.e. co-steering on trucks or busses, safety systems are known, but said co-steering systems, which are described in for example EP 0 710 601 and DK 94 00327 U3 differ from the guided steering system in that the rear wheels of the vehicle perform co-steering corresponding to the steering deflection brought about by means of the steering wheel of the vehicle and thus corresponding to the steering front wheel of the pulling vehicle or the truck. Consequently, co-steering systems of said type have no activation means which are operated from the driver's cabin of the vehicle and may generate steering, i.e. a guided steering of the rear wheels. Co-steering systems of said type provide interconnection between the co-steering rear wheels and the steering front wheels and comprise locking means corresponding to the locking means of the guided steering system described in the preamble of this description and they may furthermore comprise a speed related locking and corresponding return facility of the co-steering rear wheels when the vehicle moves at a speed exceeding a preset limited speed level, typically a speed of the order of 50 km/h as described in EP 0 710 601.

The basis of the present invention, consequently, lies in realizing that known guided steering systems in spite of their excellent qualities in improved maneuvering may entail a safety risk to the driver of the truck in question as well as to other persons in the surrounding traffic in case the driver intentionally or unintentionally activates the system for guided steering of the rear wheels of the truck when driving on an ordinary road and at normal speed.

SUMMARY OF THE INVENTION

The object of the present invention, therefore, is to eliminate the above described safety risk in known systems of guided steering of rear wheels of trucks or other similar vehicles in order to improve the maneuverability of said truck or similar vehicle and thus eliminate the safety risk inherent in systems of this art.

The object stated above is achieved by a system of the art stated above, said system in accordance with the teaching of the invention is characterized in that the system further comprises blocking means comprising speed detecting means or being adapted to cooperate with a speed detector of the vehicle for detecting the speed of the vehicle and for determining whether the speed of the vehicle is higher or lower than a preset limited speed level and cooperating with said locking means and being adapted to generate blocking of the locking means in the first position when the speed detected by the blocking means is higher than the speed limit, and to release the locking means from said blocking when the speed detected by the blocking means is lower than the speed limited.

By the guided steering system according to the present invention the aforesaid safety risk is readily eliminated, as the blocking means characterizing the invention and comprising speed detecting means or cooperating with a speed detector on the vehicle block the locking means of the system and thus prevent the driver of the truck or similar vehicle from intentionally or unintentionally making a guided steering of the rear wheels of the vehicle at a speed so high that activation of the guided steering system and a guided steering of the rear wheels of the vehicle entail a risk that the vehicle either turns over or skids, upon which the driver loses control of the vehicle. It should be remembered in this connection that vehicles of the type in question are even very large and heavy vehicles, which for example in the case of semi-trailer vehicles may be up to 18 meters long or in certain countries even longer and weigh up to 52 tons or more, so it will be readily understandable why it would be even very dangerous, not only to the driver but also other persons in the surrounding traffic, if the driver of such a vehicle should lose control of the vehicle. The system according to the present invention consequently only allows guided steering of the rear wheels of the vehicle when the speed detected by the blocking means is lower than the preset speed limit, and when the guided steering of the rear wheels of the vehicle may take place without safety risk.

For further improvement of the safety in the guided steering system according to the present invention it is preferred that the blocking means are adapted to lock the vehicle to drive at a speed below the said speed limit, preferably by locking the motor of the vehicle to run idle when the locking means are in said second position. It is thereby ensured that, after said locking means are brought to said second position and the said at least one set of rear wheels of the semi-trailer or the trailer are turned by activation of said activation means, the driver of the vehicle cannot, intentionally or unintentionally, accelerate the vehicle more than to said preset speed limit and thereby expose him/herself or other persons in the surrounding traffic to a considerable safety risk.

It will be obvious to persons skilled in the art that the system according to the present invention having the means known per se for generating said guided steering of the at least one set of rear wheels of the truck may be implemented in a variety of ways and comprise a single set of rear wheels, since the other sets of rear wheels of the semi-trailer or trailer may be either attached to the chassis of the semi-trailer or trailer and therefore cannot turn with respect to it or, as an alternative, may be embodied so that the guided steering of the said one set of rear wheels at the same time cause an elevation of the other sets of rear wheels as described in U.S. Pat. No. 5,035,439. In accordance with the teaching of the invention it is preferred that the system comprises all sets of rear wheels of the semi-trailer or trailer and that, consequently, the system comprises bearing means for rotatable journalling of all sets of rear wheels of the semi-trailer or trailer, since it is hereby ensured that the rear wheels of the semi-trailer or trailer will turn in a predictable way and, particularly in consequence of the improved safety characterizing the system according to the present invention, may generate a maximum guided steering effect on the rear wheels of the semi-trailer or trailer. By simultaneously turning all rear wheels of the semi-trailer or trailer it is further achieved that tire wear is reduced in comparison with a construction in which only one set of rear wheels generate guided steering while the remaining rear wheels carry out no guided steering function.

In accordance with the above described preferred embodiment of the system according to the present invention, in which all rear wheel sets of the semi-trailer or trailer are brought to turn by activation of the guided steering system, it is preferred that the power generating means are designed so as to generate a guiding in parallel of all rear wheels of the semi-trailer or trailer when the rear wheel is turned to one or the other side in order to achieve on the one hand a maximum steering function and on the other hand minimizing the tire wear.

In the present application the expression 'guiding in parallel' of the rear wheels of the semi-trailer or trailer is used as an expression describing the fact that sets of rear wheels are turned simultaneously and not independently of one another even if the rear wheels of the semi-trailer or trailer when turning, like the front wheels of a vehicle, do not perform a perfectly parallel movement but a movement which, with a limited deviation from the geometrically ideal parallel guiding, corresponds to the curve tracks which the wheels in question are to follow during turning of the vehicle.

The system according to the present invention, as mentioned above may be embodied in a variety of ways in accordance with technical principles known per se, for instance comprising the technical solutions described in the publications mentioned above. According to the presently preferred embodiment of the system according to the present invention, particularly the power generating means may be adapted to generate turning of the rear wheels from the said neutral position to either a maximum turned position to the one side or a corresponding maximum turned position to the other side. Consequently, the system according to this preferred embodiment of the system according to the present invention is adapted so that the guided steering rear wheels are either in said neutral position or in said maximum turned position to the one side or the other side for providing maximum maneuverability. In this embodiment the vehicle thus performs in a completely predictable way, since the rear wheels are positioned in one of three possible positions and in the steering position to either one or the other side provide a unique and completely predictable steering effect.

In accordance with an alternative embodiment of the system according to this invention the power generating means are adapted to generate a continuous turning of the rear wheels from said neutral position to either one or the other side, whereby it is possible for the driver of the vehicle to provide more or less steering effect from the rear wheels and thus, by activating the activation means provide more or less steering effect corresponding to the generating of more or less turning of the steering wheel of the vehicle to provide more or less turning by the steering front wheels of the vehicle.

Depending on the vehicle construction in question and in consideration of feasible and reliant technical solutions, the system for guided steering of the truck or similar vehicle may be embodied as an electrically, a pneumatically or preferably a hydraulically generated system or a combination of such systems, since the individual parts of the system, for example the power generating means may be electrically, pneumatically or preferably hydraulically activated, whereas the other elements or parts of the system may be implemented as electrically, pneumatically or hydraulically activated or controlled components or parts, or a combination thereof. In the preferred embodiment of the system according to the present invention the system is a combined hydraulically activated and electrically controlled system but other system constructions are possible within the scope of the protection without thereby deviating from the scope of the invention.

In the blocking means characteristic to the invention, the detection of the speed of the vehicle as mentioned above may be performed by means of a separate speed detector or a separate speed detecting means mounted on the vehicle and connected to and cooperating with the blocking means according to the teaching of the present invention. Alternatively and preferably, the system according to the present invention utilizes a speed detector which is mounted on the vehicle, and which may be connected to either the speedometer of the vehicle or in modern vehicles be inherent in the ABS brake system of the vehicle, and the system is consequently designed as an integrated safety part of the general safety equipment of the vehicle.

For improvement of the safety of the system it is preferred that the blocking means are adapted to provoke the said blocking of the locking means in case no speed is detected, and to only generate said release of the locking means from said blocking provided the speed is positively detected as a speed which is lower than said speed limit. It is thereby ensured that, in case of malfunction, e.g. in the speed detector or in other parts of the mechanic, hydraulic, pneumatic or electric system, no overruling of the overall safety consideration takes place, in other words that the system according to the present invention can only be activated to provide guided steering of the rear wheels of the vehicle when the vehicle is moving unambiguously at a sufficiently low speed in consideration of safety. Depending on the size and stability of the vehicle in question said speed limit may be chosen relatively high or low, but it is presumed that in no system for any use at all may the limit be set higher than 30 km/h and preferably lower than 20 km/h. In the presently preferred embodiment of the system according to the present invention said limit has been set at 10 km/h in order to ensure that the increased maneuverability, but simultaneously reduced stability of the vehicle, which is achieved when guided steering affects the rear wheels of the vehicle, does not occur at irresponsibly high speed.

The system according to the present invention may be elaborated in a variety of ways and as stated above may be combined with the other safety equipment of the vehicle. In this connection it may also be particularly adapted so that the blocking means are adapted to cooperate with the transmission of the vehicle, and be adapted to only allow release of the locking means from the said blocking when the transmission is set in a lowest gear for driving forwards or backwards. A double security is thereby achieved in that the activation of the system is prevented for example in case of a fatal malfunction if the vehicle is set in any other than the lowest gear, and thus drives at a speed higher than the speed determined by the lowest gear of the vehicle. The system may alternatively be designed to only allow guided steering of the rear wheels if the vehicle is in reverse gear; this however, will unambiguously reduce the maneuverability of the vehicle in comparison with a vehicle being steerable by guided steering of the rear wheels when driving forwards as well as backwards.

BRIEF DESCRIPTION OF THE DRAWINGS

The invention is explained in the following with reference to the drawing in which.

DESCRIPTION OF THE PREFERRED EMBODIMENT(S)

Figure 1:
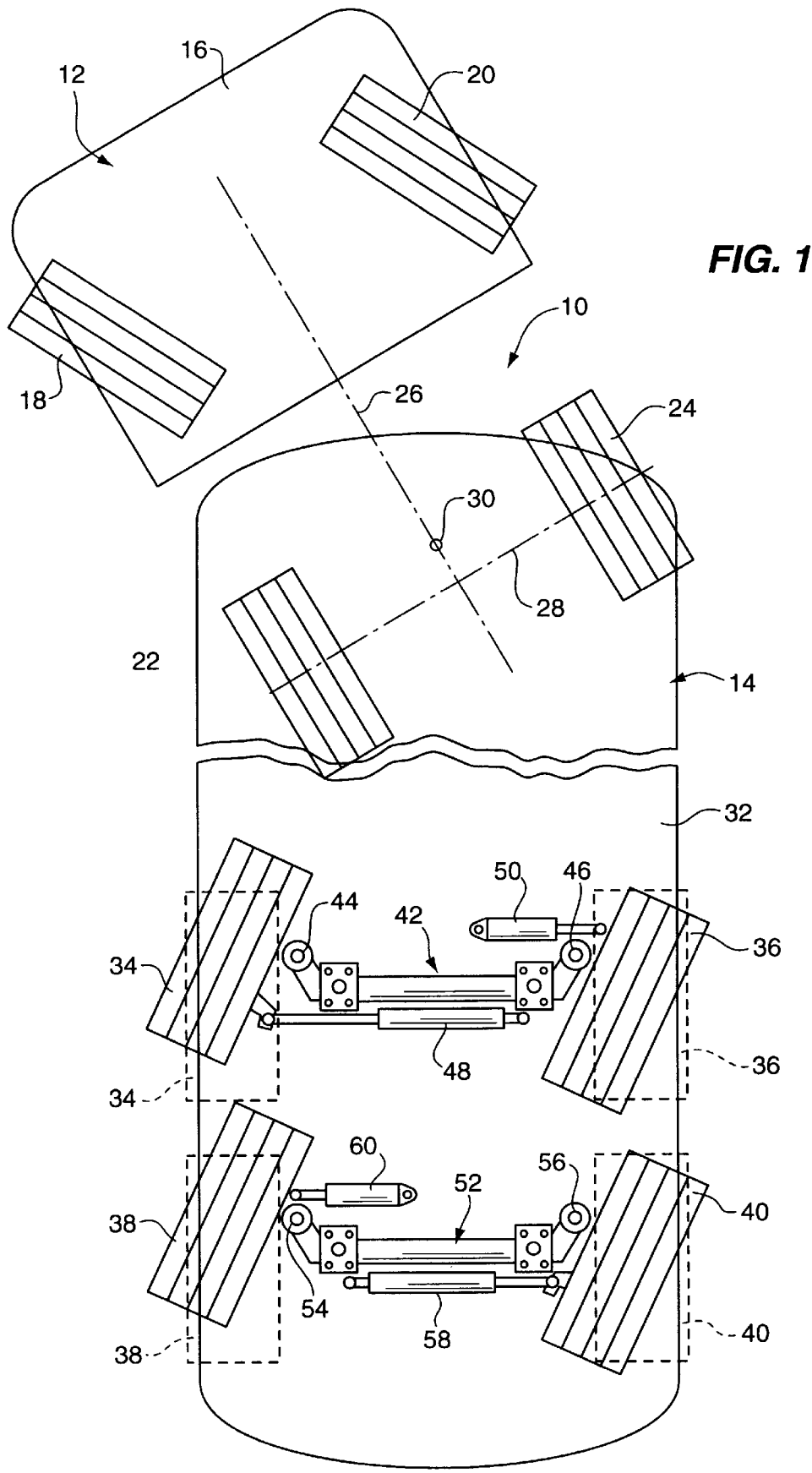
FIG. 1 is a schematical and partly cross-sectional view of a semi-trailer vehicle seen from above and having guided steering means for the rear wheels of the vehicle.

FIG. 1 schematically shows a truck 10, comprising a pulling vehicle or tractor 12 and a trailer or semi-trailer 14. The pulling vehicle or tractor 12 has a driver's cabin 16 mounted on the chassis of the tractor, said chassis rotatably supporting two front wheels, a left front wheel 18 and a right front wheel 20, respectively, as well as two rear wheels, a left rear wheel 22 and a right rear wheel 24, respectively. The longitudinal axis of the tractor is marked by the reference numeral 26 and the center axis of the rear wheels 22 and 24 is marked by the reference numeral 28. Reference numeral 30 is the rotation axis of the semi-trailer with respect to the chassis of the tractor 12.

The semi-trailer 14 comprises a chassis or a semi-trailer box 32, which is rotatably journalled with respect to the tractor about the above described rotation axis 30. The semi-trailer 14 has two sets of rear wheels, a foremost set of rear wheels comprising a left rear wheel 34 and a right rear wheel 36, and a hindmost set of rear wheels comprising a left rear wheel 38 and a right rear wheel 40. In FIG. 1 the rear wheels 34, 36, 38 and 40 are shown in fill lines in a position turned so that the maneuverability of the total vehicle is improved, as the steering rear wheels 34, 36, 38 and 40 increase the turning ability of the vehicle 10. In FIG. 1 the front wheels 18 and 20 of the tractor 10 are turned to the left so that the total vehicle turns sharply to the left, and at the same time the rear wheels 34, 36, 38 and 40 shown in full lines are turned so that the total vehicle turns sharply to the left, thereby turning more sharply to the left than a vehicle having no guidedly steered rear wheels on the trailer or semi-trailer. Here it should be noted that the rear wheels 34, 36, 38 and 40 of the semi-trailer 14 naturally can turn not only from the positions shown in dotted lines in FIG. 1 to the positions shown in full lines in FIG. 1, but also may turn to the other side, thereby generating turning of the vehicle to the right. In FIG. 1 the rear wheels 34, 36, 38 and 40 are shown in dotted lines in a center position, in which the rear wheels 34, 36, 38 and 40 are not steering, and in which center position or neutral position the rear wheels are locked when the vehicle 10 moves at a speed exceeding a maximum speed preset for safety reasons, above which speed the rear wheels 34, 36, 38 and 40 of the semi-trailer must not be activated to generate guided steering of the vehicle 10. It should be realized that the vehicle shown in FIG. 1 generates an even very sharp turning of the rear wheels 34, 36, 38 and 40 in the position shown in full lines, and, provided the vehicle moves at a speed of 60 km/h or 70 km/h, a turning or swaying so sharp may entail that the vehicle turns over or that the vehicle is brought to skid, upon which the driver of the vehicle involuntarily will lose control of the vehicle.

Figure 2:
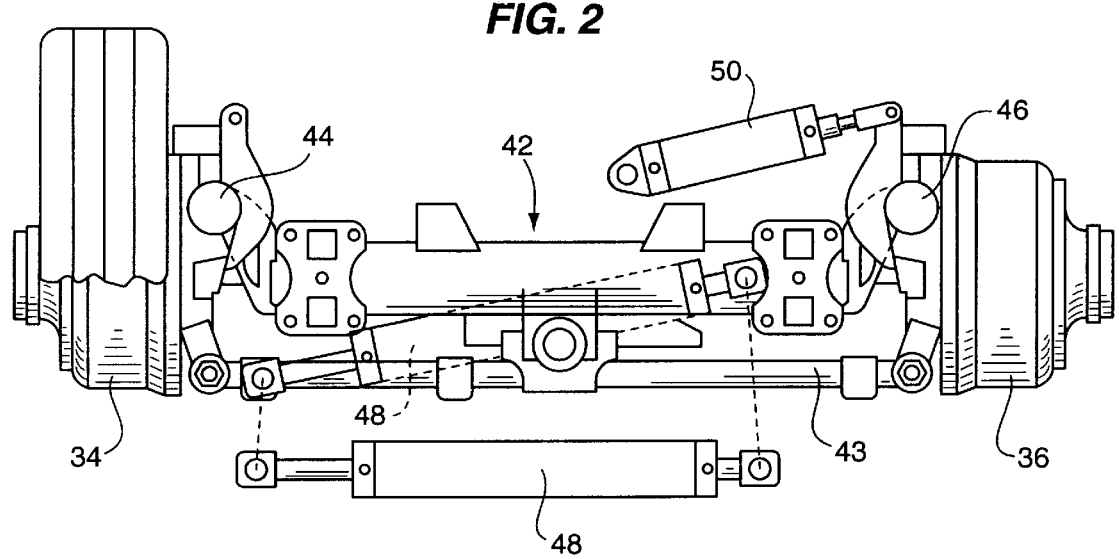
FIG. 2 is a schematical and partly cross-sectional view of a rear wheel axle arrangement for generating guided steering of rear wheels on a semi-trailer or a trailer.

The reference numeral 42 in FIG. 1 designates a foremost rear wheel axle arrangement for the foremost rear wheels 34 and 36 of the semi-trailer, said wheels being rotatably journalled with respect to the chassis of the semi-trailer 14 and thus with respect to the rear wheel arrangement 42 from the positions shown in dotted lines in FIG. 1 to the position about rotation axes 44 and 46, respectively, shown in full lines in FIG. 1. The turning of the rear wheels 34 and 36 is generated by means of a connection rod, shown in FIG. 2 and designated the reference numeral 43, as well as by means of a a main cylinder 48 and a subcylinder 50, respectively, which are interlocked by means of a hydraulic circuit, which will be described below with reference to FIG. 4, to generate a parallel guiding of the two rear wheels 34 and 36 pertaining to the foremost set of rear wheels of the semi-trailer 14. Likewise, the two hindmost rear wheels 38 and 40 of the semi-trailer 14 are mounted on a rear wheel axle arrangement 52 which, corresponding to the rotation axes 44 and 46 has rotation axes 54 and 56, about which the rear wheels 38 and 40 may rotate with respect to the rear wheel axle arrangement 52, the same way as the rear wheels 34 and 36 may turn about the axes 44 and 46 with respect to the rear wheel arrangement 42. The hindmost rear wheel arrangement 52 like the foremost rear wheel arrangement 42 has a connection rod, which is shown in FIG. 2 and designated the reference numeral 53, as well as two hydraulic cylinders in the form of a main cylinder 58 and a subcylinder 60, which like the main cylinder 48 and the subcylinder 50 in the foremost rear wheel arrangement 42 are interlocked in a hydraulic circuit for generating a parallel guiding of the two rear wheels 38 and 40. The rear wheel arrangement 52, however, differs from the foremost rear wheel arrangement 42 in that the main cylinder 58 acts on the right rear wheel 40 whereas the subcylinder 60 acts on the left rear wheel 38, the main cylinder 48 and the subcylinder 50 likewise in the foremost rear wheel arrangement 42 acting on the left rear wheel 34 and the right rear wheel 36, respectively. This difference between the two rear wheel arrangements 42 and 52 solely serves to provide a symmetric rear wheel construction and improve the inherent stability of the entire rear wheel construction.

FIG. 2 shows, in greater details, the rear wheel arrangement 42 of the two foremost rear wheels 34 and 36 of the semi-trailer 14. As in FIG. 1 the rear wheel arrangement 42 is seen in planar view. Apart from that FIG. 2 shows the same components pertaining to the rear wheel arrangement 42 as shown in FIG. 1 and described above, and further shows the detailed location of the main cylinder 48 and the subcylinder 50.

Figure 3:
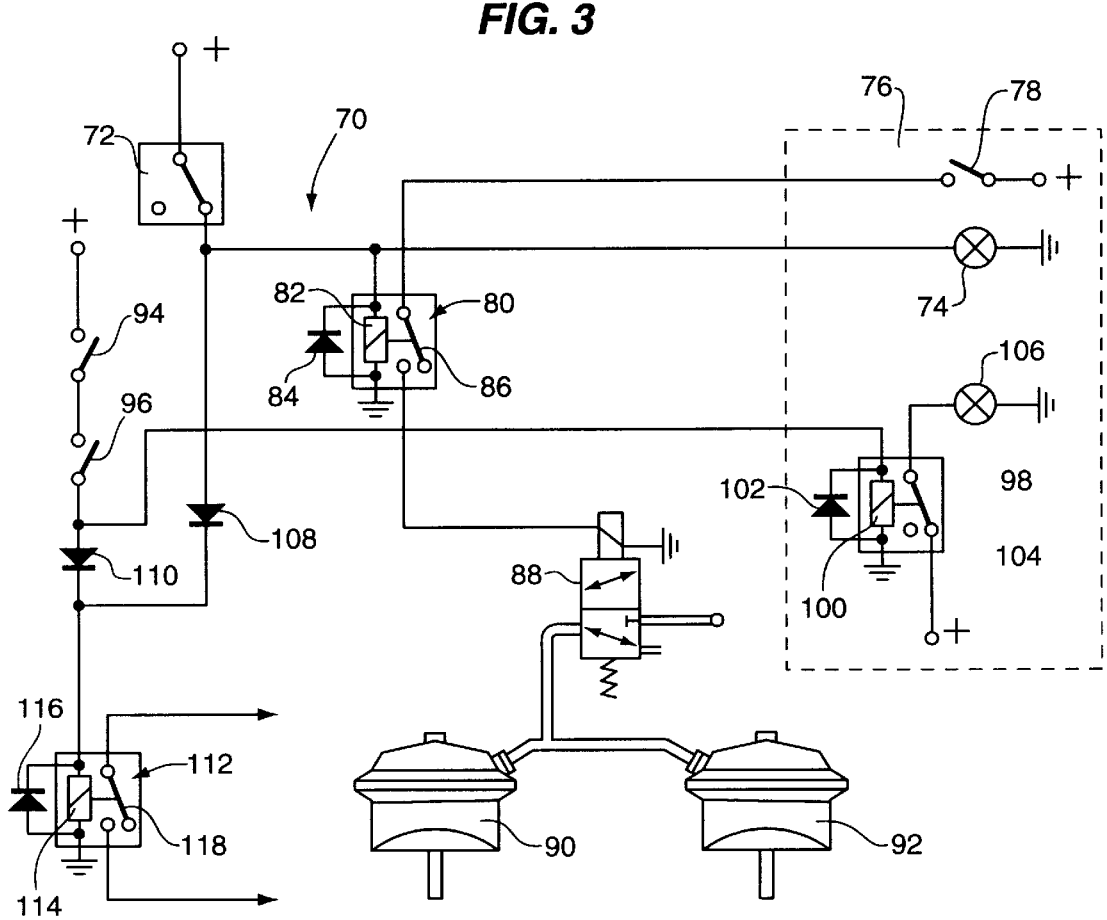
FIG. 3 is an electric and hydraulic circuit diagram of the safety blocking part of the system.

Shown in FIG. 3 is an electric diagram of a safety system in the system according to the present invention. The safety system serves to ensure that the guided steering of the rear wheels of the vehicle on the semi-trailer or trailer is only generatable when the vehicle moves at a speed which is lower that the above mentioned maximum speed of preferably 10 km/h. The overall safety system is designated the reference numeral 70 and comprises a switch 72, which is activated by a speed relay of the ABS brake system of the vehicle, said relay being activated when the speed of the vehicle exceeds the said maximum speed. In FIG. 3 a situation is shown where the vehicle either stands still or moves at a speed which is lower than said maximum speed or speed limit. The switch 72, consequently, supplies power to an indicator lamp 74 on an operation panel 76 in the driver's cabin of the vehicle. The lamp 74 thereby informs the driver of the vehicle that it is possible to perform guided steering of the rear wheels of the semi-trailer. The operation panel 76 further contains a switch 78, which the driver of the vehicle may operate in order to release the rear wheels of the semi-trailer from the center positions shown in dotted lines in FIG. 1 of the drawing, and thereby bring the rear wheels to turn to either the left or the right. The safety system further includes a relay 80 having a coil 82, and over the coil a turn off diode connected in parallel as well as a contact 86, which in the rest position of the relay is open. The relay 80 is activated simultaneously with a power being supplied to the control lamp 74 via the switch 72, whereby the contact 86 closes. The contact 78 of the operation panel 76 is connected in a series configuration with the contact 86 and, when the relay 80 is activated and the contact 86 closed, may supply power to a magnetic valve 88. The magnetic valve 88 provides normal pressure via the pneumatic circuit of the vehicle to two spring-loaded pneumatic locking devices 90 and 92, which are normally, i.e. without air pressure, locked, and which are mounted on the rear wheel arrangement 42 and the rear wheel arrangement 52, respectively. By activation of the magnetic valve 88 air pressure is supplied to the spring-loaded pneumatic locking membranes 90 and 92, as will be seen from the upper part of FIG. 4, upon which it is possible, as will be explained below with reference to FIG. 4, to perform a guided steering of the rear wheels 34 and 36 as well as the rear wheels 38 and 40 pertaining to the rear wheel arrangements 42 and 52, respectively. The safety system shown in FIG. 3 further comprises a number of switches 94 and 96, which are preferably embodied as non-contact switches pertaining to the locking membrane devices 90 and 92 and mounted on one of the two rear wheel arrangements. Likewise, corresponding switches connected in a series configuration are provided for the second rear wheel arrangement, said switches being embodied as non-contact switches. The switches 94 and 96 are turned off when the corresponding rear wheels are in the central or neutral position, but close when the rear wheels are turned from said positions shown in dotted lines in FIG. 1. Power is thereby supplied through the switches 94 and 96 to a relay 98 which, like the relay 80 described above has a coil 100, a turn-off diode 102 connected in parallel with the coil and a switch 104. When the coil 100 is activated, the switch 104 is turned off, which again disconnects the supply of power to a control lamp 106 included in the operation panel 76, said control lamp informing the driver that the rear wheels of the vehicle are no longer in the locked central or neutral position.

The safety system further includes a relay 112 which, like the relays 80 and 88 described above, includes a coil 114, a turn-off diode 118 connected in series with the coil and a contact 112. Power is supplied to the relay either via a diode 108 from the switch 72 or via a diode 110 from the contacts 94 and 96. The contact 118 of the relay 112 is connected to the ETC steering of the vehicle's motor and keeps the motor running idle when power is supplied to the relay 112 through either the diode 108 or the diode 110, corresponding to respective detection of whether or not the speed of the vehicle is slower than 10 km/h, and whether the axle locks pertaining to the locking membrane devices 90 and 92 are released, which is detected by the switches 94 and 96.

Figure 4:
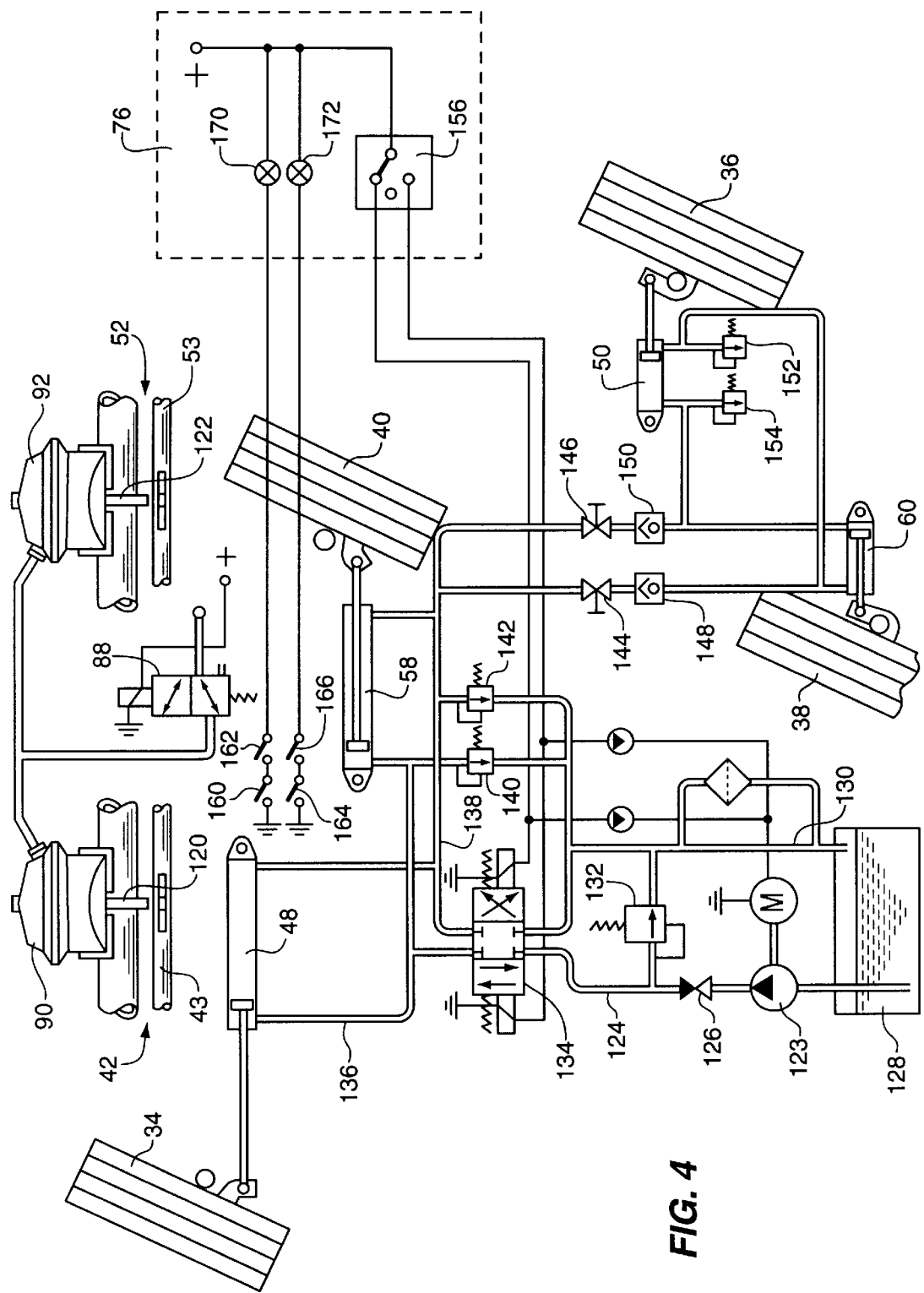
FIG. 4 is an overall diagramatic view of the hydraulic system part of the system.

FIG. 4 shows in details the hydraulic circuit of the system according to the present invention. The upper part of FIG. 4, as mentioned above, shows the locking membrane devices 90 and 92, the protruding locking taps of which, 120 and 122 respectively, are adapted to interlock with the pertaining connection rods 43 and 53, respectively, of the rear wheel arrangements 42 and 52, respectively. The lower half of FIG. 4 shows the rear wheels 34, 36, 38 and 40 or the semi-trailer, the location of the rear wheels in the diagram of FIG. 4 not corresponding to the physical location of the rear wheel, but rather determined by the consideration of the clarity of the diagram. Similarly the corresponding cylinders, ie. the main cylinders 48 and 58 pertaining to the wheels 34 and 40, respectively, and the subcylinders 50 and 60 pertaining the the wheels 36 and 38, respectively, are placed juxtaposed the respective wheels. The hydraulic circuit includes a hydraulic engine, which supplies hydraulic pressure liquid via a pump to a feeding line 124 through a one-way valve 126. The pump 123 sucks hydraulic liquid from a hydraulic liquid container 128, which is furthermore in connection with the hydraulic circuit via a return line 130. A pressure relief valve 132 is inserted between the feeding line 124 and the return line 130. The feeding line and the return line, 124 and 130 respectively, are in connection with an electric/hydraulic three-position valve 134. In the neutral position shown in FIG. 4 the connection from the feeding line 124 and the return line 130 to the main cylinders 48 and 58 and furthermore to the subcylinders 50 and 60 is shut off, but when the electric/hydraulic three-position valve 134 is activated to either side, a connection is established between the feeding line 124 and the return line 130 to the hydraulic circuit comprising the main cylinders 48 and 58 as well as the subcylinders 50 and 60. The main cylinders 48 and 58 are coupled in a symmetric cross coupling, the front compartment of the main cylinder 48, i.e. the compartment in front of the plunger of the cylinder, being coupled to the same hydraulic line 136 as the rear compartment of the main cylinder 58. Similarly, the rear compartment of the hydraulic cylinder 48 is coupled to the same hydraulic line 138 as the front compartment of the hydraulic cylinder 58. Pressure relief valves, 140 and 142 respectively, are inserted between the hydraulic lines 136 and 138 and the return line 130. The hydraulic circuit further comprises a branch from the hydraulic line 138, said branch leading through two adjustable valves 144 and 146 and two respective check valves 148 and 158 to the front compartments of the subcylinders 50 and 60 and the rear compartments of the subcylinders, respectively. Safety valves 152 and 154 are furthermore inserted in the respective branches of the subcylinder 50. The branches to the subcylinders 50 and 60 serve the purpose of providing a hydraulic guided leading of the set of rear wheels comprising the rear wheels 34 and 36 in parallel with the set of rear wheels comprising the rear wheels 38 and 40, thus preventing one set of rear wheels from turning more or less than the other set of rear wheels. The subcylinders 50 and 60 are coupled in a cross coupling to the main cylinders 48 and 58 and are furthermore interconnected in said cross coupling. It is thereby achieved that provided one set of rear wheels performs a non-parallel track with respect to the other set of rear wheels, a pressure difference is accumulated over one of the subcylinders, causing that by release through the cross coupling of the hydraulic circuit said pressure difference performs guided steering of the rear wheels so that not only the rear wheels pertaining to a set of rear wheels in consequence of the mechanical coupling via the pertaining connecting rod are led in parallel with each other, but so that the two sets of rear wheels are continuously led or steered in parallel with each other.

The electric control of the electric/hydraulic three-way valve 134 is achieved by means of a three-position switch 156 which is likewise included in the control panel 76, and which receives power through the switch 72. By shifting the switch 156 from a central position, in which the connection through the switch 156 is disconnected, to one of the two outer positions, one of which is shown in FIG. 4, power is supplied to the two coils of the electric/hydraulic three-position valve 134. The electric/hydraulic three-position valve 134 is thereby activated for establishing a connection from the hydraulic feeding line 124 to one of the two hydraulic lines 136 and 138, and from the hydraulic return line 130 to the other of the two hydraulic lines 136 and 138. By movement of the rear wheels 34, 36, 38 and 40 from the central positions shown in dotted lines in FIG. 1, a switching of sets of contacts mounted on the respective axles is provided, said sets of contacts being shown in FIG. 4 and designated the reference numerals 160, 162, 164 and 166. The switch sets 160 and 162 are mounted so as to detect a turning of the wheels to the left, whereas the switches 164 and 166 are mounted so as to detect a turning of the wheels to the right into the position shown in FIG. 4. A connection is thereby established through the switches 164 and 166 from the feeding line, which also supplies the three-position switch 156, through a corresponding lamp 172 which indicates to the driver that the rear wheels have been turned to the right. By turning in the opposite direction, i.e. turning to the left, the switches 160 and 162 are closed, thereby turning on a corresponding lamp 170 to indicate to the driver that the wheels 34, 36, 38 and 40 have been turned to the left. When the wheels 34, 36, 38 and 40 are in the central position shown in dotted lines in FIG. 1, all the contacts 160, 162, 164 and 166 are turned off, entailing that also the lamps 170 and 172 are turned off.

Although the invention has been described above with reference to a specific example of an embodiment it will be obvious to persons skilled in the art that within the scope of the invention a variety of changes and modifications may be made according to the present invention without thereby deviating from the spirit and the aim of the invention as it is defined in the patent claims below. Thus, in alternative embodiments of the system according to the present invention it is possible to implement the system as a pneumatic system and further to use separate detectors, possibly with a corresponding microprocessor control for activating the respective pressurized-air cylinders monitored by a speed detector, separately mounted on the vehicle, as well as to either detect the movement of the vehicle with respect to the earth or in a satellite navigation system to receive information from a communication satellite. Apart from such microprocessor controlled pressurized-air implementing of the system according to the present invention, it is possible to replace parts of the system described above by equivalent electric or pneumatic elements and replace parts of the hydraulic components described above by corresponding mechanic, pneumatic or electric components.

I claim:

1. System for guided steering of at least one set of rear wheels of a semi-trailer or trailer of a truck or vehicle said system comprising said semi-trailer or trailer as well as a truck trailer or tractor, and comprising bearing means in which said rear wheels are journalled rotatably with respect to the chassis of the semi-trailer or trailer so that said rear wheels can turn from a neutral position, in which the rear wheels generate no steering effect, to one side for generating steering of the vehicle in one direction with respect to said neutral position, or to the other side for generating steering of the vehicle in the opposite direction with regard to said neutral position, power generating means constructed and arranged to act on said rear wheels and, by activation, to generate said turning of said rear wheels to one or the other side, activation means mounted in the driver's cabin of the vehicle and constructed and arranged to be operated by the driver of the vehicle for activation of the power generating means to generate steering of the said at least one set of rear wheels independently of the steering of the truck trailer or tractor, and locking means constructed and arranged to be operated from the driver's cabin of the vehicle for generating, in a first position, locking of said rear wheels in said neutral position, and being switchable from said first position to a second position in which the rear wheels are released and may be brought to turn by activation of the activation means, CHARACTERIZED IN that the system further comprises blocking means comprising speed detecting means or being constructed and arranged to cooperate with a speed detector of the vehicle for detecting the speed of the vehicle and for determining whether the speed of the vehicle is higher or lower than a preset speed limit and cooperating with said locking means and being constructed and arranged to generate blocking of the locking means in said first position when the speed detected by the blocking means is higher than said speed limit and to release the locking means from said blocking when the speed detected by the blocking means is lower than said speed limit, and in that the blocking means are constructed and arranged to lock the vehicle to drive at a speed lower than said speed limit, preferably by keeping the motor of the vehicle in idle when the locking means are in said second position.

2. System according to claim 1, CHARACTERIZED IN that the system comprises all sets of rear wheels of the semi-trailer or trailer and that the system has bearing means for rotatably journalling all sets of rear wheels of the semi-trailer or trailer.

3. System according to claim 1, CHARACTERIZED IN that the power generating means are constructed and arranged to generate a guiding in parallel of all rear wheels of the semi-trailer or trailer.

4. System according to claim 1, CHARACTERIZED IN that the power generating means are constructed and arranged to generate a turning of the rear wheels from said neutral position to either a maximum turning position to the one side or a corresponding maximum turning position to the other side.

5. System according to claim 1, CHARACTERIZED IN that the power generating means are constructed and arranged to generate a continuous turning of the rear wheels from said neutral position to either the one side or the other side.

6. System according to claim 1, CHARACTERIZED IN that the system is an electrically, pneumatically or preferably hydraulically driven system.

7. System according to claim 1, CHARACTERIZED IN that the blocking means are constructed and arranged to cooperate with a speed detector of the ABS brake system of the vehicle.

8. System according to claim 1, CHARACTERIZED IN that the blocking means are constructed and arranged to generate said blocking of said locking means, provided no speed is detected and only to generate said release of said locking means from said blocking provided the speed is positively detected as a speed lower than said speed limit.

9. System according to claim 1, CHARACTERIZED IN that said speed limit is lower than 30 km/h.

10. System according to claim 1, CHARACTERIZED IN that said speed limit is lower than 20 km/h.

11. System according to claim 1 CHARACTERIZED IN that said speed limit is 10 km/h.

12. System for guided steering of at least one set of rear wheels of a semi-trailer or trailer of a truck or vehicle said system comprising said semi-trailer or trailer as well as a truck trailer or tractor, and comprising bearing means in which said rear wheels are journalled rotatably with respect to the chassis of the semi-trailer or trailer so that said rear wheels can turn from a neutral position, in which the rear wheels generate no steering effect, to one side for generating steering of the vehicle in one direction with respect to said neutral position, or to the other side for generating steering of the vehicle in the opposite direction with regard to said neutral position, power generating means constructed and arranged to act on said rear wheels and, by activation, to generate said turning of said rear wheels to one or the other side, activation means mounted in the driver's cabin of the vehicle and constructed and arranged to be operated by the driver of the vehicle for activation of the power generating means to generate steering of the said at least one set of rear wheels independently of the steering of the truck trailer or tractor, and locking means constructed and arranged to be operated from the driver's cabin of the vehicle for generating, in a first position, locking of said rear wheels in said neutral position, and being switchable from said first position to a second position in which the rear wheels are released and may be brought to turn by activation of the activation means, CHARACTERIZED IN that the system further comprises blocking means comprising speed detecting means or being constructed and arranged to cooperate with a speed detector of the vehicle for detecting the speed of the vehicle and for determining whether the speed of the vehicle is higher or lower than a preset speed limit and cooperating with said locking means and being constructed and arranged to generate blocking of the locking means in said first position when the speed detected by the blocking means is higher than said speed limit and to release the locking means from said blocking when the speed detected by the blocking means is lower than said speed limit, and in that the blocking means are constructed and arranged to cooperate with the gear-change and are constructed and arranged to only allow release of the locking means from said blocking when the gear-change is set in a lowest gear for driving forwards or in reverse gear.

13. System according to claim 12, CHARACTERIZED IN that the blocking means are constructed and arranged to lock the vehicle to drive at a speed lower than said speed limit, preferably by keeping the motor of the vehicle in idle when the locking means are in said second position.

14. System according to claim 12, CHARACTERIZED IN that the system comprises all sets of rear wheels of the semi-trailer or trailer and that the system has bearing means for rotatably journalling all sets of rear wheels of the semi-trailer or trailer.

15. System according to claim 12, CHARACTERIZED IN that the power generating means are constructed and arranged to generate a guiding in parallel of all rear wheels of the semi-trailer or trailer.

16. System according to claim 12, CHARACTERIZED IN that the power generating means are constructed and arranged to generate a turning of the rear wheels from said neutral position t either a maximum turning position to the one side or a corresponding maximum turning position to the other side.

17. System according to claim 12, CHARACTERIZED IN that the power generating means are constructed and arranged to generate a continuous turning of the rear wheels from said neutral position to either the one side or the other side.

18. System according to claim 12, CHARACTERIZED IN that the system is an electrically, pneumatically or preferably hydraulically driven system.

19. System according to claim 12, CHARACTERIZED IN that the blocking means are constructed and arranged to cooperate with a speed detector of the ABS brake system of the vehicle.

20. System according to claim 12, CHARACTERIZED IN that the blocking means are constructed and arranged to generate said blocking of said locking means, provided no speed is detected and only to generate said release of said locking means from said blocking provided the speed is positively detected as a speed lower than said speed limit.

21. System according to claim 12, CHARACTERIZED IN that said speed limit is lower than 30 km/h.

22. System according to claim 12, CHARACTERIZED IN that said speed limit is lower than 20 km/h.

23. System according to claim 12, CHARACTERIZED IN that said speed limit is 10 km/h.

* * * * *

UNITED STATES PATENT AND TRADEMARK OFFICE
CERTIFICATE OF CORRECTION

PATENT NO.   : 6,131,691
DATED        : October 17, 2000
INVENTOR(S)  : Leo Morch It is certified that error appears in the above-identified patent and that said Letters Patent is hereby corrected as shown below:

Title page,
Item [30], change "Sep. 13, 1996 [DK] Denmark............9600308 U" to
-- Sep. 13, 1996 [DK] Denmark.... 00308/96 --;

Column 2,
Line 9, after "of" delete -- the --;
Line 16, "loosing" should be -- losing --;
Line 67, "limited" should be -- limit --;

Column 8,
Line 65, after "pertaining" insert -- to --;

Column 12,
Line 60, "t" should be -- to --.

Signed and Sealed this

Seventh Day of January, 2003

JAMES E. ROGAN
*Director of the United States Patent and Trademark Office*